_3,485,591_
_Patented Dec. 23, 1969_

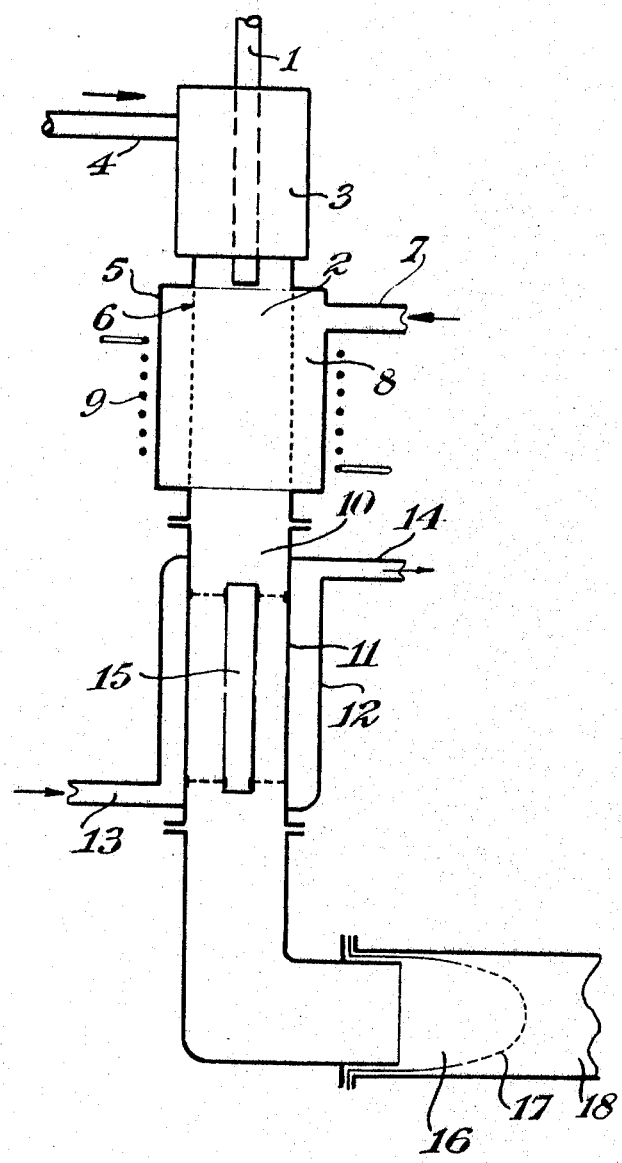

3,485,591
PREPARATION OF PIGMENTARY SILICON CARBIDE
Arthur Wallace Evans, Nunthorpe, Middlesbrough, and Reginald George Wynne, West Hartlepool, England, and Chester Waldemar Marynowski, Mountain View, Calif., assignors to British Titan Products Company Limited, Billingham, England, a corporation of the United Kingdom
Filed Feb. 7, 1966, Ser. No. 525,699
Claims priority, application Great Britain, Feb. 15, 1965, 6,381/65
Int. Cl. C22c 29/00
U.S. Cl. 23—208
12 Claims

ABSTRACT OF THE DISCLOSURE

A plasma process for the production of silicon carbide is disclosed. Particulate silicon oxide and a carbonaceous reactant are introduced into a radio frequency induced plasma. The silicon oxide is vaporized in the plasma, and reaction with the carbonaceous material is initiated. The reaction zone is maintained in the range of 2200° C. to 2700° C. The induction coil which is energized to form the plasma is contained between two walls forming the reaction vessels. The inner wall of the reaction vessel which defines the reaction zone is gas permeable and a gas is transpired through said inner wall into the reaction zone thereby inhibiting carbon deposition on the wall. Particulate silicon carbide is withdrawn from the reaction zone.

---

The present invention relates to the production of finely-divided silicon carbide.

Silicon carbide is normally manufactured by the reduction of quartz sand with coke in an electric furnace. After reaction, the furnace is cooled and the silicon carbide in lump form is removed and crushed. Various grades are produced by a series of operations involving further grinding and screening and it is possible by a laborious system of dry or wet milling and classification to produce a grade which will show only a minor retention on a 325 mesh screen, i.e. most of the particles are smaller than 43 microns. The product is comparatively impure and is black or grey in colour.

Silicon carbide can exist in either the alpha or beta form. When the impurity levels are low, particularly with respect to nitrogen and aluminium, the alpha form is colourless. The beta form is generally considered to be yellow, but it is envisaged that this yellow colour is due, at least in part, to residual impurities and the present invention may make it possible to produce so pure a product that its yellow colour might be diminished or removed.

The present invention provides an efficient method of preparing a relatively pure and finely-divided silicon carbide.

According to the invention, a process for the production of fine particle silicon carbide comprises reacting a vaporized silicon oxide with a carbonaceous substance in a radio-frequency induced plasma whereby silicon carbide is formed.

The silicon oxide will normally be silica. The carbonaceous substrate will normally be a hydrocarbon vapour or gas, such as methane, but it may be any carbonaceous material which will liberate carbon in the plasma so as to maintain the production of the silicon carbide.

The silica is desirably vaporized by the plasma in which it is reduced. The vaporization should take place promptly when the silica enters the plasma. In order to ensure this, it is desirable to introduce the silica into the plasma in the form of a "lean" dispersion of fine particles suspended in a carrier gas. The size of the particles is desirably less than 210 microns, preferably less than 150 microns, to facilitate their rapid vaporization. A method of producing a lean suspension of silica particles in a gas which is particularly adapted for introduction into the plasma of the present invention is described in British Patent No. 1,093,442, which provides a process comprising feeding the gas into a chamber containing a mass of the particles with a velocity sufficient to cause turbulence so as to break down agglomerates of the particles and entrain the particles as a suspension in the gas, removing a first portion of the suspension from the chamber through a take-off duct, filtering particles from a second portion of the suspension and feeding part or all of the gas thus filtered into the take-off duct.

The temperature in the reaction and condensation zone is preferably maintained in the range of 2200 to 2500° C. by the heat transferred to the reactants from the plasma. A temperature above 2700° C. is desirably avoided, as at higher temperatures silicon carbide may be decomposed to silicon vapour and carbon. The temperature of the plasma itself may of course be much higher than this.

In order to maintain the reduction of the silica, the plasma reaction zone must contain free carbon vapour. In the present process, it has been found that if sufficient of the carbonaceous substance is supplied to the plasma to provide a safe excess of free carbon vapour, there is a tendency for some of the carbon to condense and be deposited on the wall of the reaction zone. This deposit may in time form a substantial layer of carbon on the inside of this wall. This layer will be electrically conducting, and may therefore cause overheating and eventual fusion of the wall.

The present invention also provides means to inhibit or prevent the formation of a substantial layer of carbon on the wall of the reaction zone, as described above. Such means comprises forming the wall (on which the carbon would otherwise deposit) of a porous material and transpiring a gas or a vaporizable liquid through this wall, whereby the deposit of carbon on the wall is inhibited or prevented.

The working gas for the plasma may be an easily ionised gas. Potassium or other alkali metals or compounds may be added to the working gas to increase the degree of ionisation of the gas. The plasma may be formed in a zone contained in a refractory tube, e.g. a quartz tube, and the working gas may be introduced into the tube either axially or tangentially.

The induction coil employed to couple energy to the plasma is conventionally wound either as a single-layer solenoid or as a spiral (single plane) winding. However, each of these conventional windings produces a plasma that is displaced slightly downstream of the coil, the amount of displacement being a function of the flow rate, the composition and the method of injection of the working fluid. Introduction of the silica powder by means of the axial flow of carrier gas causes an additional element of variability in the equilibrium position of the plasma. Consequently, it is difficult to design accurately for the optimum spacing of components to provide for maximum heating of the injected powder and simultaneously to provide an adequate margin of safety to avoid overheating of the powder injection tube.

This difficulty may be avoided by the use of a conventional induction coil and the plasma may be magnetically confined by the use of a reverse turn of the coil at the downstream end and optionally also at the upstream end of the plasma, in the manner disclosed in British Patent No. 1,093,441. The reverse turn at the downstream end is particularly desirable.

The stability of the induction plasma is affected by the method of introduction of the working gas. Tangential injection at one end of the refractory tube creates a helical flow pattern that effectively stabilizes the plasma and simultaneously cools the walls of the tube but when the silica powder is fed into the plasma, heating and vaporisation is not uniform and the flow pattern also causes impaction of molten particles of silica on the walls with the build-up of an adherent deposit. Such deposition of silica is suppressed by employing sheath flow in which the majority of the working gas is made to travel in an axial direction as a thin high velocity sheath adjacent to the inside wall of the refractory tube and this is a particularly effective method of stabilising the plasma.

If the tube has a transpiring wall, as described above, this not only prevents deposition of a conducting film of carbon but also aids in eliminating wall deposition of silica, which is a further advantage of such a wall if tangential introduction of the working gas is employed.

One method of operating according to the technique of the transpiring wall is to use a reaction zone confined in a chamber consisting of a double walled cylinder sealed at both ends with the inner wall made of fritted silica. The working gas, which may be an easily ionisable gas (such as argon), is passed to the reactor head and admitted into the top of the central cylinder. Simultaneously, a proportion of a carbonaceous substance, e.g. gaseous hydrocarbon such as methane, is admitted with this gas stream and a more difficultly ionisable gas such as hydrogen or carbon monoxide is fed into the annular space and thence transpired through the porous wall.

The ratio of the working gas to the transpired gas may range from 10:1 to 1:10 by volume, but is preferably about 1:1. As the ratio of the working gas to the transpired gas falls below about 1:1 by volume, there is the danger that the plasma may go out or extend to the feed space outside the transpired wall. At ratios of working gas to transpired gas above 1:1 by volume, measured and expressed under similar conditions, the plasma is normally stable. Of course, the transpired gas must be in sufficient volume to inhibit or prevent deposition on the walls, which is its primary purpose. This difficulty with regard to the ratio of the working gas to the transpired gas is overcome when the induction coil is wound in the form of a single layer solenoid or a helix around the inner porous wall of the double walled cylinder, as described below.

In the above method, a mixture of the working gas (which acts as the carrier gas) and the transpired gas issues from the end of the reaction zone away from the inlet of the working gas. It would normally be desirable to be able to recycle the effluent working gas and the effluent transpired gas to the reaction zone. This is particularly true of the working gas, which is preferably arong (which is expensive to obtain) and of which large amounts must be passed through the plasma in order to produce a relatively small amount of silicon carbide. Unfortunately, recycling may be impracticable because it will normally be very difficult to separate the effluent mixture into its own main constituents. This difficulty would, of course, be overcome if one could use the same gas as both working gas and transpired gas, but this is not usually practicable in the above method for the reason that, as already stated, the plasma may extend to the feed space outside the transpired wall.

The present invention provides a means for overcoming this problem, by making it possible for the working gas and the transpired gas to be the same gas. This means comprises forming the induction coil as a single layer solenoid or helix around the inner gas porous wall of the double walled cylinder, so that the coil is located in the feed space for the transpired gas. This arrangement is quite practical and allows for the preferred working gas (namely argon) to be used also as the transpired gas.

Depending on the working gas used and on the power supplied to the coil it may be necessary to use an insulated copper coil, and a coil inserted in a silica sheath of the appropriate dimensions has been found suitable for this purpose. In this method of operation, the product and other solids are removed from the effluent gas by any of the conventional methods described below and being already cooled it can be recycled directly for re-use. The concentration of the gases resulting from the reaction, mainly carbon monoxide and hydrogen in the working gas, will gradually increase and these must be periodically (or continuously) separated.

The transpired gas has an additional effect in that it cools the inner wall of the reaction zone. Under certain conditions it may be preferable to sub-divide the annular jacket forming the feed space for the transpired gas into several zones along the axis of the reactor to employ different transpiration rates in each zone to accommodate the different levels of heat flux.

The temperature of the reaction zone is desirably 2200 to 2500° C., as mentioned above. The supply of heat should be sufficient to cause the prompt vaporization of the silica mentioned above and for this purpose, it has been found that, for silica of particle size 44 to 150 microns, a minimum specific plasma enthalpy of about 30 kilocalories per gram mole is normally required.

The effluent gas from the reaction zone may be cooled and the silicon carbide entrained in it may be separated.

The effluent gas cooler may be any form of conventional heat exchanger but conveniently is a water jacketed copper heat exchanger and cooling can be aided by the injection of a cold gas. The degree of cooling required is dependent on the type of equipment used to collect and separate the silicon carbide from the gases. Any degree of cooling can be obtained by the injection of a cold gas, which is preferably some of the gas which issued earlier from the reaction zone and which has already been cooled.

If this injection of a cold gas is not desired, very effective cooling is obtained by modification of the heat exchanger. In this modification, a solid copper cylinder slightly smaller in diameter than the inner heat exchanger tube is mounted axially within that tube so that the effluent gases are forced to travel through the resulting annular space. In an actual case, a solid copper cylinder two feet long was used. In operation, the copper cylinder rapidly attained an equilibrium axial temperature distribution such that its upstream end acted as a heat sink while its downstream end was kept continuously cool by convection and radiation to the water-cooled surrounding wall of the heat exchanger. Effluent gas from the modified heat exchanger was found to be at essentially ambient temperature. The upstream end of the copper heat sink cylinder was prevented from melting by the high thermal conductivity of copper.

The collection of the fine particle silicon carbide and its separation from the cooled gases may be achieved by conventional means, for example fabric filters, cyclones or electrostatic precipitation. The use of a fritted glass-fibre filter allows of collection from only partly cooled gases but higher collection efficiency is attained by the use of filters of natural or synthetic fibres such as a high efficiency acrylic fibre filter cloth. If a fabric filter is used, the gases must be well cooled to prevent charring of the fabric. In practice, it has been found that, when using fabric filters, there is a tendency for the build-up of back pressure due to partial blinding of the cloth by the fine particle product and electrostatic precipitators have been the preferred form of collection device.

The present invention makes possible the production of silicon carbide in finely-divided form, particularly in pigmentary form. In order to produce silicon carbide with precisely the required particle size, one may vary the characteristics of the plasma or of the various gases taking part in the process. The temperature gradient after the gas stream has left the plasma can affect the particle size of the product. Thus, very quick cooling of the gas stream immediately it has left the plasma, as takes place in normal processes, may favour the production of subpigmenary particles. It may, therefore, be described to cool the gas stream slowly so as to favour residual reaction leading to a building up of the particle size so that it enters the pigmentary range. Another controlling feature is the velocity of the gas stream leaving the plasma, which may be suitably regulated.

The accompanying drawing shows diagrammatically a system in which the process of the present invention can be operated.

In the system of the drawing, a stream of carrier gas containing a lean suspension of silica enters the reaction zone 2 through pipe 1. By means of manifold 3, this stream is mixed with another stream of carrier gas entering through pipe 4 and containing the carbonaceous material as a vapour.

The reaction zone 2 is surrounded by a double-walled cylinder 5, whose inner wall 6 is gas permeable. A transpired gas is admitted through inlet 7 into the annular space 8 from which it transpires through the inner wall 6 into the reaction zone 2.

The reaction zone is surrounded by a coil 9 connected to a radio-frequency source (not shown). When the coil is energised, a plasma is formed in the reaction zone 2.

The gas stream emerging from the plasma passes into a heat exchanger 10 having an inner wall 11 and an outer wall 12 between which water is flowed by means of inlet 13 and outlet 14.

A solid copper cylinder 15 located inside the heat exchanger 10 forms a heat sink, as described above.

From the heat exchanger, the gas stream is passed to a collecting area 16 where the solid product is filtered from the gas stream by a filter bag 17, the filtered gas stream flowing away through pipe 18.

The invention is illustrated by the following example.

EXAMPLE

In an actual process according to the invention, the system used was similar to that shown in the drawing and describe above. The carrier gas was argon fed at a rate of 0.6 cubic foot per minute. Part of the argon entered through pipe 1 and contained a lean suspension of fine silica powder of particle size 44 to 150 microns (the suspension had been produced by the process of British Patent No. 1,093,442. The silica entered the reaction zone at a rate of 1.5 grams per minute. The remainder of the argon entered through pipe 4; it contained 0.04 cubic foot per minute of methane. The transpired gas was hydrogen, which was admitted through inlet 7 at a rate of 0.6 cubic foot per minute. The power supply to the coil was 0.2 kilowatts.

The initial product was a fine powder. It was washed with hydrofluoric acid so as to remove any unreacted silica. The final product consisted of silicon carbide of particle size less than 1 micron.

The transpired hydrogen effectively prevented the deposition of a conducting film of carbon on the inner wall 6.

As indicated by the above specific description, hydrogen may be introduced into the plasma. The purpose is to improve the heating efficiency of the plasma. The amount of hydrogen may be about 5 to 15%, by volume of the carrier gas.

It has been found desirable to construct the reactor head, from which the plasma extends, of a dielectric material. Teflon has proved satisfactory in practice. Metal construction can be used if desired, but the metal may become overheated during prolonged operation of the process; this overheating is presumably due to eddy current induced by the coil.

When the process is being started up, the plasma may be initiated by first employing a low power and a low gas flow rate of an easily ionisable gas, and then raising these simultaneously to the working values.

The tube through which the suspension of silica is introduced into the plasma (1 in the system shown in the drawing) is desirably formed so that it tapers at its end. This concentrates the suspension as a narrow jet piercing the heart of the plasma, and lessens the amount of suspension which by-passes the plasma by flowing round it. The tapered tube can provide better vaporization efficiency than a tube with a cylindrical end of the same internal diameter as the rest of the tube.

What is claimed is:

1. In a process for the production of silicon carbide by reaction between silicon oxide and a carbonaceous reactant, the improvement which comprises
    (a) providing a reaction vessel comprising a double walled cylinder having an inner, gas permeable wall and an outer, gas impermeable wall, said inner and outer walls spaced apart, said inner wall defining a reaction zone in said vessel, and an induction coil formed as a solenoid positioned between said walls in surrounding relation to said inner wall;
    (b) introducing into said reaction zone an easily ionizable gas;
    (c) energizing said induction coil to convert said easily ionizable gas to a radio frequency induced plasma;
    (d) introducing into said plasma in said reaction zone said silicon oxide in solid, particulate form and said carbonaceous reactant in an amount to provide in said plasma an excess of free-carbon vapor whereby said silicon oxide is vaporized and reacts with said carbonaceous reactant to form silicon carbide;
    (e) introducing a gas between the walls of said reaction vessel and transpiring said gas through said inner, gas permeable wall into said reaction zone whereby carbon deposition on said inner wall is inhibited;
    (f) maintaining the temperature in said reaction zone in the range of 2200° C. to 2700° C.; and reaction zone.
    (g) withdrawing particulate silicon carbide from said 2. The process of claim 1 in which the plasma is formed by an induction coil formed as a single layer solenoid.

3. The process of claim 2 in which the coil has a reverse turn at the downstream end of the plasma.

4. The process of claim 2 in which the coil has a reverse turn at the upstream end of the plasma.

5. The process of claim 1 in which the silicon oxide is silica.

6. The process of claim 5 in which the particle size of the silica is from 44 to 150 microns and the plasma has a specific enthalpy of at least 30 kilocalories per gram mole.

7. The process of claim 1 in which the transpired gas is a difficulty ionisable non-oxidising gas.

8. The process of claim 7 in which the transpired gas is selected from the group consisting of hydrogen and carbon monoxide.

9. A process in accordance with claim 1 wherein said silicon carbide withdrawn from said reaction zone in step (g) is withdrawn in a stream of gas carrying said silicon carbide, said stream being cooled at a controlled rate for the recovery of the silicon carbide as particles of pigmentary size, rapid cooling favoring formation of subpigmentary particles and slower cooling favoring buildup of particles to the desired pigmentary size.

10. In a process for the production of silicon carbide by reaction between silicon oxide and a carbonaceous reactant, the improvement which comprises
    (a) providing a reaction vessel comprising a double walled cylinder having an inner, gas permeable wall and an outer, gas impermeable wall, said inner and outer walls spaced apart, said inner wall defining a reaction zone in said vessel, and an induction coil formed as a solenoid positioned between said walls in surrounding relation to said inner wall;

(b) introducing argon into said reaction zone;

(c) energizing said induction coil to convert said argon to a radio frequency induced plasma;

(d) Forming a suspension in argon of silica particles having a particle size in the range of 44 to 150 microns;

(e) forming a mixture of argon and a gaseous hydrocarbon;

(f) injecting gaseous suspension from step (d) and gaseous mixture from step (e) into said argon plasma whereby said silica is vaporized and reacts with said hydrocarbon to form silicon carbide, the amount of said gaseous mixture from step (e) providing sufficient gaseous hydrocarbon to the plasma to maintain therein a substantial excess of free-carbon vapor;

(g) introducing between the walls of said reaction vessel at least one gas selected from the group consisting of argon, hydrogen and carbon monoxide and transpiring said gas through said inner, gas permeable wall into said reaction zone whereby carbon deposition on said inner wall is inhibited, the ratio of argon introduced in step (f) to the gas transpired being in the range of from about 10:1 to about 1:10 by volume;

(h) maintaining the temperature in said reaction zone in the range of 2200° C. to 2500° C.; and (i) withdrawing particulate silicon carbide from said reaction zone.

11. A process in accordance with claim 10 wherein said transpired gas is argon.

12. A process in accordance with claim 10 wherein said transpired gas is hydrogen in an amount of about 5 to 15% by volume of said argon.

References Cited

UNITED STATES PATENTS

| | | | |
|---|---|---|---|
| 2,333,948 | 11/1943 | Muskat | 23—144 X |
| 2,670,275 | 2/1954 | Olson et al. | |
| 3,049,488 | 8/1962 | Jackson et al. | 204—312 |
| 3,275,408 | 9/1966 | Winterburn. | |
| 3,291,715 | 12/1966 | Anderson | 204—298 |
| 3,306,705 | 2/1967 | Leineweber et al. | |
| 3,340,020 | 9/1967 | Neuenschwander et al. | |

OSCAR R. VERTIZ, Primary Examiner

G. T. OZAKI, Assistant Examiner

U.S. Cl. X.R.

204—157, 164